United States Patent
Hong

(10) Patent No.: US 7,385,319 B2
(45) Date of Patent: Jun. 10, 2008

(54) MOTOR FIXING STRUCTURE OF RECIPROCATING COMPRESSOR

(75) Inventor: Eon-Pyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 10/752,006

(22) Filed: Jan. 7, 2004

(65) Prior Publication Data

US 2004/0208759 A1 Oct. 21, 2004

(30) Foreign Application Priority Data

Apr. 18, 2003 (KR) ............... 10-2003-0024787

(51) Int. Cl.
*H02K 35/04* (2006.01)
*F04B 35/04* (2006.01)

(52) U.S. Cl. ..................... 310/15; 417/417

(58) Field of Classification Search ............ 310/15, 310/156.13; 417/312, 360, 417
See application file for complete search history.

(56) References Cited

U.S. PATENT DOCUMENTS

| | | | | |
|---|---|---|---|---|
| 1,688,891 A * | 10/1928 | Spreen | ............ | 310/51 |
| 3,497,735 A * | 2/1970 | Diederichs et al. | ............ | 310/42 |
| 4,336,470 A * | 6/1982 | Gutris | ............ | 310/42 |
| 4,961,973 A * | 10/1990 | Molnar | ............ | 427/449 |
| 5,614,312 A * | 3/1997 | Tucker et al. | ............ | 428/323 |
| 5,704,111 A * | 1/1998 | Johnson et al. | ............ | 29/598 |
| 5,772,410 A | 6/1998 | Chang | | |
| 5,795,989 A * | 8/1998 | Simmons et al. | ............ | 73/7 |
| 5,820,180 A * | 10/1998 | Haupt | ............ | 294/16 |
| 5,830,168 A * | 11/1998 | Finnell et al. | ............ | 602/24 |
| 6,073,360 A * | 6/2000 | Struble | ............ | 33/783 |
| 6,077,054 A * | 6/2000 | Lee et al. | ............ | 417/417 |
| 6,104,570 A * | 8/2000 | Pelstring | ............ | 360/98.07 |
| 6,755,627 B2 * | 6/2004 | Chang | ............ | 417/417 |
| 6,863,197 B1 * | 3/2005 | Dirlam et al. | ............ | 223/93 |
| 2003/0102763 A1 * | 6/2003 | Park | ............ | 310/216 |

FOREIGN PATENT DOCUMENTS

WO    WO 02/095232 A1 * 11/2002

* cited by examiner

*Primary Examiner*—Tram Nguyen
(74) *Attorney, Agent, or Firm*—Birch, Stewart, Kolasch & Birch, LLP

(57) ABSTRACT

Disclosed is a motor fixing structure of a reciprocating compressor comprising: a front frame having a predetermined shape; a middle frame positioned with a certain interval from the front frame; an outer stator positioned between the front frame and the middle frame so that an inner stator can be positioned with a certain interval therein; a coupling means for fixing the outer stator positioned between the front frame and the middle frame by coupling the front frame and the middle frame to each other; and a sliding preventing means installed between the outer stator and the front frame contacting each other and/or between the outer stator and the middle frame contacting each other for preventing sliding. According to this, a motor assembly is simplified, and abrasion and damage of components are prevented by preventing a motor assembly dimension variation during driving.

1 Claim, 6 Drawing Sheets

MOTOR FIXING STRUCTURE OF RECIPROCATING COMPRESSOR

This Nonprofessional application claims priority under 35 U.S.C. §119(a) on Patent Application No. 10-2003-0024787 filed in KOREA on Apr. 18, 2003, the entire contents of which are hereby incorporated by reference.

BACKGROUND OF THE INVENTION

1. Field of the Invention

The present invention relates to a reciprocating compressor, and more particularly, to a motor fixing structure of a reciprocating compressor capable of simplifying a motor assembly and preventing an assembly dimension variation after the motor assembly.

2. Description of the Conventional Art

Generally, a reciprocating compressor is an apparatus for sucking and compressing refrigerant gas in accordance with a piston reciprocates in a cylinder. The reciprocating compressor is largely divided into two methods by a driving mechanism. One is a method that a rotary motion of a motor is converted into a linear reciprocation motion thus to be transmitted to a piston, and the other is a method that a linear reciprocation motion of a motor is directly transmitted to a piston.

FIG. 1 is a view showing one embodiment of a reciprocating compressor in which a linear reciprocation motion of a motor is directly transmitted to a piston. As shown, the reciprocating compressor comprises a casing 10 to which a gas suction pipe 1 and a gas discharge pipe 2 are coupled, a front frame 20 and a middle frame 30 installed in the casing 10 with a certain interval by being elastically supported, a driving motor 40 installed between the front frame 20 and the middle frame 30 for generating a driving force, a cylinder 50 inserted into the front frame 20, a piston 60 for receiving a driving force of the driving motor 40 and thus linearly reciprocating in the cylinder 50, a rear frame 70 for covering the piston 60, a resonance spring 80 for inducing resonance by elastically supporting the piston 60, and a valve assembly 90 for opening and closing a gas channel in order to suck and compress gas into the cylinder 50 according to a linear reciprocation of the piston 60.

The driving motor 40 includes an outer stator 41 mounted between the front frame 20 and the middle frame 30, an inner stator 42 inserted into the outer stator 41 with a certain interval and mounted at the front frame 20, a winding coil 43 coupled to the outer stator 41, and a mover linear-movably inserted between the outer stator 41 and the inner stator 42. The mover 44 is composed of a holder 45 of a cylindrical shape and a plurality of magnets 46 coupled to the holder 45, and the holder is connected to the piston 60.

An unexplained reference number 100 denotes a coupling bolt, 101 denotes a nut, 102 denotes a discharge cover, and 103 denote a valve spring.

Operation of the reciprocating compressor will be explained as follows.

First, when an electric power source is applied to the driving motor 40, a flux is formed at the outer stator 41 and the inner stator 42 by an electric current applied to the winding coil 42 of the driving motor 40. By an interaction between said flux and a flux formed by the mover 44, the mover 44 linearly reciprocates and thereby the piston 60 linearly reciprocates in the cylinder 50. By a pressure difference inside of the cylinder 50 by the linear reciprocation of the piston 60, the valve assembly 90 opens and closes a gas channel thus to suck gas into the cylinder 50, compress, and discharge. Said processes are repeated and thereby gas is continuously compressed.

A performance and a reliability of the reciprocating compressor are influenced by an air gap between the outer stator 41 and the inner stator 42 into which the mover 44 of the driving motor is inserted. Accordingly, at the time of assembling the reciprocating compressor, it is important to assemble the driving motor 40 in a condition that the air gap of the driving motor 40 can be maintained as it is. Also, it is important to maintain the air gap constantly even at the time of driving the reciprocating compressor.

In the conventional motor fixing structure of the reciprocating compressor, as shown in FIGS. 2 and 3, the inner stator 42 is fixedly coupled to a cylindrical body 21 of the front frame, and one side surface of the outer stator 41 is in contact with an inner side surface of a plate portion 22 of the front frame extending and formed at one side of the cylindrical body 21 with a certain area. Also, one side surface of the middle frame 30 having a predetermined thickness and an area is in contact with the other side surface of the outer stator 41. A plurality of coupling bolts 100 are inserted into the front frame 20 and the middle frame 30 with a certain interval, and the nuts 101 are coupled to the coupling bolts 100 thus to couple the front frame 20 and the middle frame 30 to each other. By the coupling between the front frame 20 and the middle frame 30, the outer stator 41 is fixedly coupled.

The outer stator 41 is formed in accordance with thin plates L1 of a predetermined shape are radially stacked as a cylindrical shape. At this time, the thin plates L1 are radially stacked on the winding coil 43 of a ring shape. The outer stator 41 and the winding coil 43 positioned in the outer stator 41 are molded with a plastic resin material for insulation and shape maintenance.

The inner stator 42 is formed as a cylindrical shape having a certain length in accordance with thin plates L2 of a quadrangular shape are radially stacked at an outer circumferential surface of the cylindrical body 21 of the front frame.

The construction components are assembled by using a jig in order to constantly maintain an interval between an inner circumferential surface of the outer stator 41 and an outer circumferential surface of the inner stator 42 and an interval between the inner/outer circumferential surfaces and the mover 44 inserted therebetween.

In the conventional motor fixing structure, the outer stator 41 is fixed by coupling the plurality of coupling bolts 100 and the nuts 101 in a state that the front frame 20 and the middle frame 30 are respectively in contact with both side surfaces of the outer stator 41, thereby simplifying the structure, reducing an assembly dimension modification for the air gap maintenance, and thus enabling a great quantity of production. However, a fixing of the driving motor 40 becomes inferior by a vibration generated when the compressor is operated, that is, when gas is sucked and compressed while the piston 60 linearly reciprocates in the cylinder 50, so that the air gap is not constantly maintained. Additionally, when the motor is operated for a long time, a dimension of the outer stator 41 is diminished by a molding of the outer stator 41, thereby increasing a dimension variance of the air gap. According to this, the mover 44 linearly reciprocating between the outer stator 41 and the inner stator 42 is in contact with the outer stator 41 and the inner stator 42, thereby causing abrasion and damage of the components and thus degrading a reliability of a product.

SUMMARY OF THE INVENTION

Therefore, an object of the present invention is to provide a motor fixing structure of a reciprocating compressor capable of simplifying a motor assembly and preventing abrasion and damage of components by preventing an assembly dimension variation after the motor assembly.

To achieve these and other advantages and in accordance with the purpose of the present invention, as embodied and broadly described herein, there is provided a motor fixing structure of a reciprocating compressor comprising: a front frame having a predetermined shape; a middle frame positioned with a certain interval from the front frame; an outer stator positioned between the front frame and the middle frame so that an inner stator can be positioned with a certain interval therein; a coupling means for fixing the outer stator positioned between the front frame and the middle frame by coupling the front frame and the middle frame to each other; and a sliding preventing means installed between the outer stator and the front frame in contact with each other and/or between the outer stator and the middle frame in contact with each other for preventing sliding.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
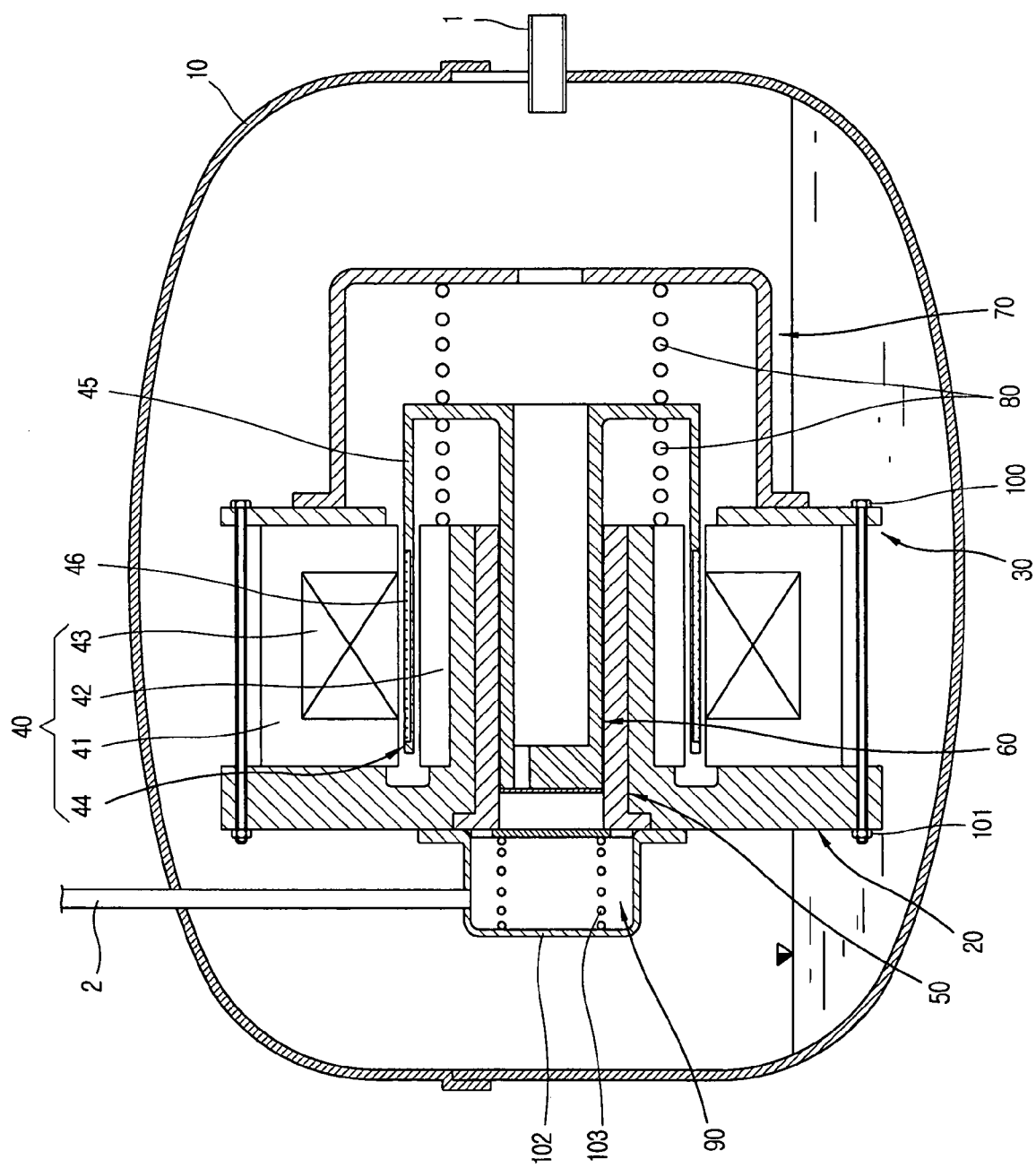
FIG. 1 is a sectional view showing a general reciprocating compressor.
Figure 2:
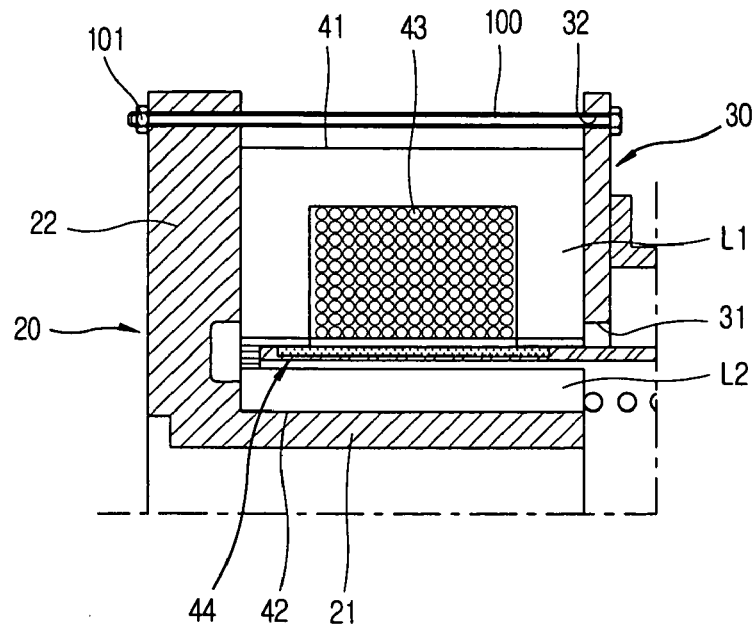
FIG. 2 is a sectional view showing a motor fixing structure of a reciprocating compressor in accordance with the conventional art.
Figure 3:
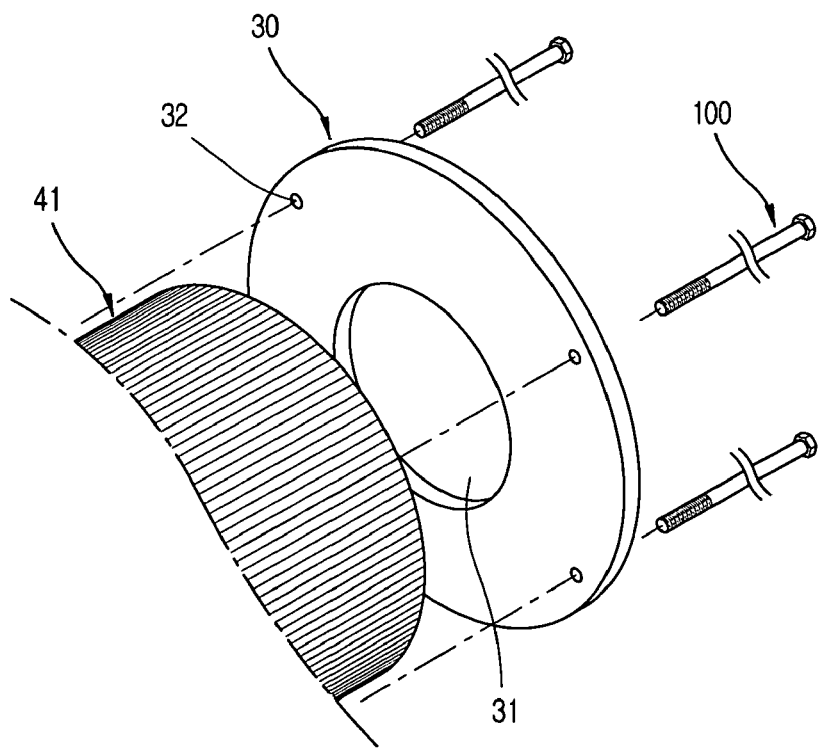
FIG. 3 is a disassembled perspective view of a motor fixing structure of a reciprocating compressor in accordance with the conventional art.
Figure 4:
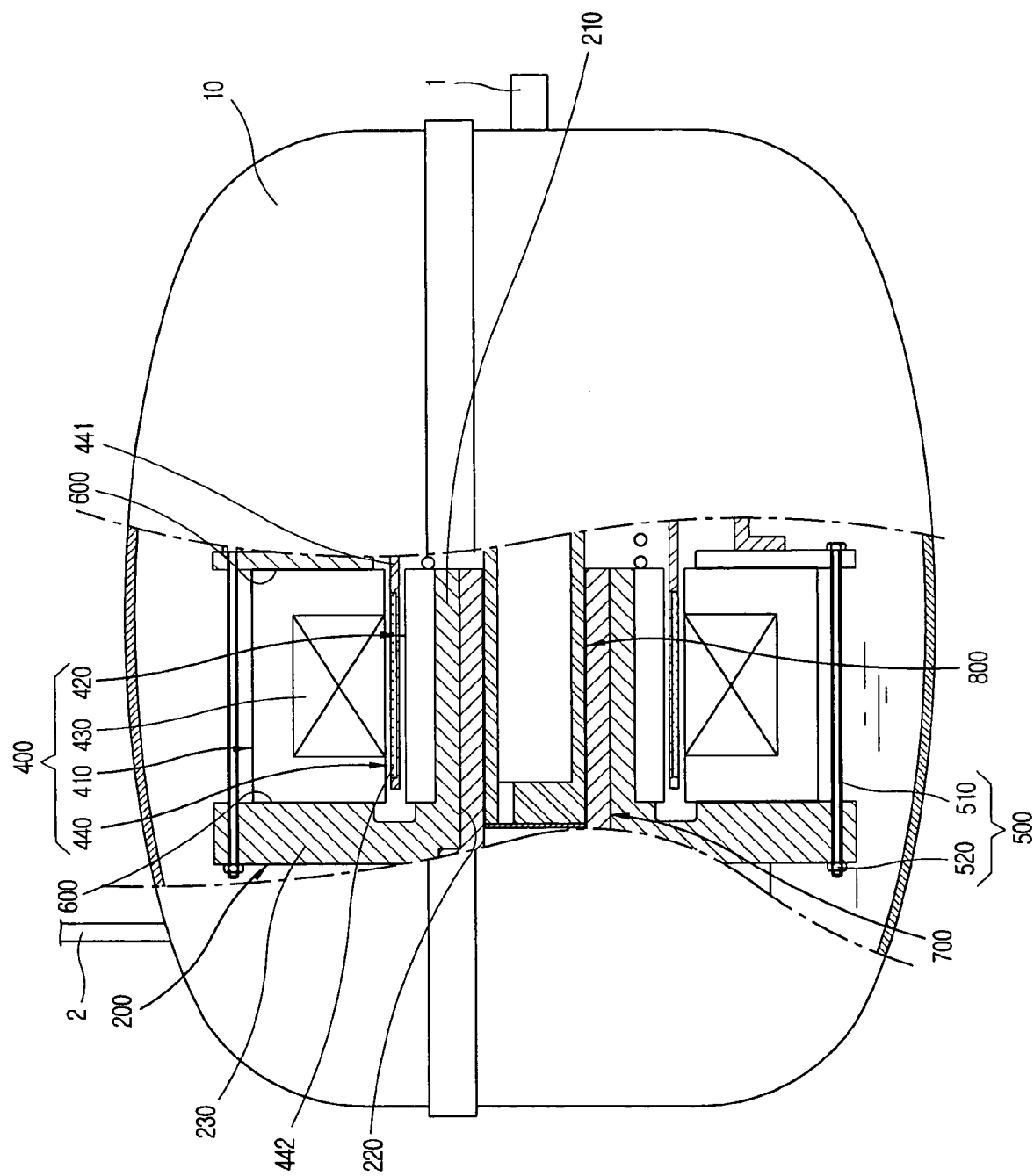
FIG. 4 is a partially cut frontal view of a reciprocating compressor to which one embodiment of a motor fixing structure of a reciprocating compressor according to the present invention is applied.
Figure 5:
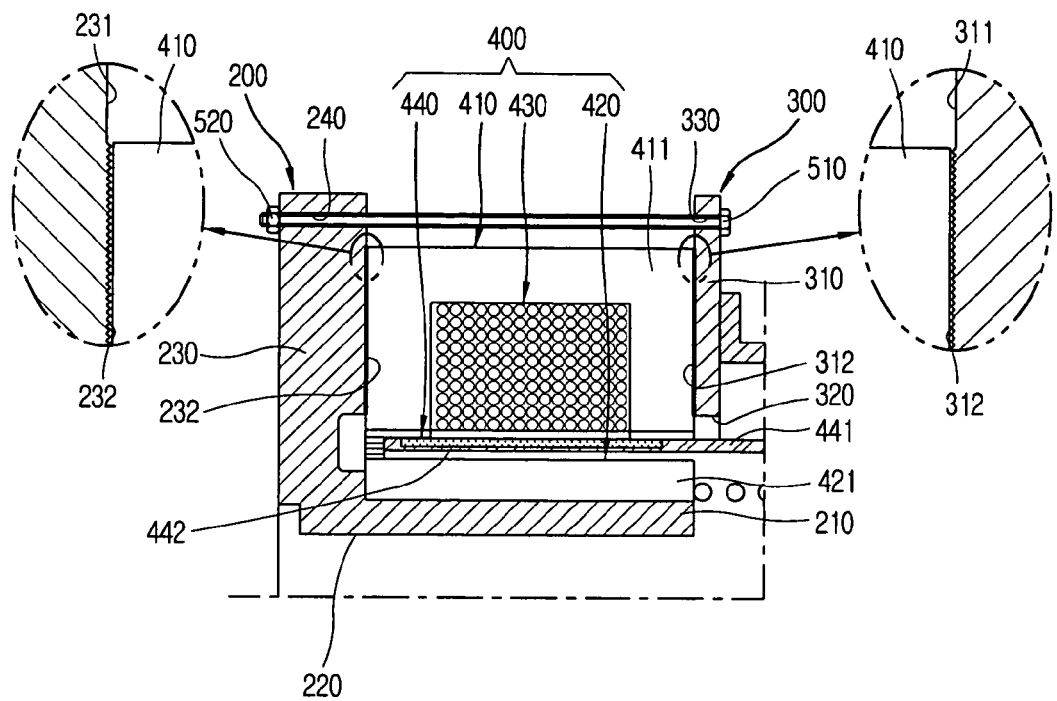
FIG. 5 is a sectional view showing one embodiment of a motor fixing structure of a reciprocating compressor according to the present invention.
Figure 6:
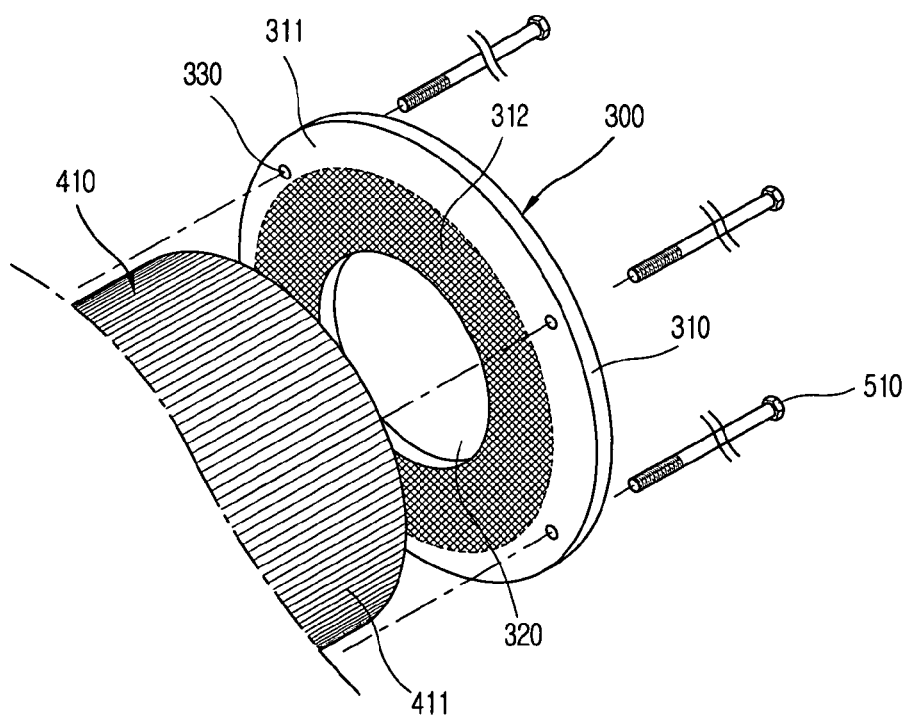
FIG. 6 is a disassembled perspective view showing one embodiment of a motor fixing structure of a reciprocating compressor according to the present invention.

FIG. 4 is a partially cut frontal view of a reciprocating compressor to which one embodiment of a motor fixing structure of a reciprocating compressor according to the present invention is applied, FIG. 5 is a sectional view showing one embodiment of a motor fixing structure of a reciprocating compressor according to the present invention, and FIG. 6 is a disassembled perspective view showing one embodiment of a motor fixing structure of a reciprocating compressor according to the present invention.

As shown, the motor fixing structure of a reciprocating compressor comprises a front frame 200 having a predetermined shape, a middle frame 300 positioned with a certain interval from the front frame 200, an outer stator 410 of a motor positioned between the front frame 200 and the middle frame 300 so that an inner stator 420 of a motor can be positioned with a certain interval therein, a coupling means 500 for fixing the outer stator 410 positioned between the front frame 200 and the middle frame 300 by coupling the front frame 200 and the middle frame 300 to each other, and a sliding preventing means 600 installed between the outer stator 410 and the front frame 200 which are in contact with each other and between the outer stator 410 and the middle frame 300 which are in contact with each other for preventing sliding.

The front frame 200 includes a cylindrical body 210, a cylinder inserting hole 220 penetratingly formed in the cylindrical body 210 and to which a cylinder 700 is inserted, a plate portion 230 extending and formed at one side of the cylindrical body 210 with a certain area, and a plurality of penetration holes 240 penetratingly formed at an edge of the plate portion 230. A cylinder 700 is coupled to the cylinder inserting hole 220 of the front frame 200.

The inner stator 420 of a motor is coupled to the cylindrical body 210 of the front frame. The inner stator 420 is formed accordingly as thin plates 421 of a quadrangular shape are radially stacked at an outer circumferential surface of the cylindrical body 210.

The middle frame 300 is constituted with a plate portion 310 having a certain thickness and area, a center hole 320 formed in the middle of the plate portion 310, and a plurality of penetration holes 330 formed at an edge of the plate portion 310. The number of the penetration holes 330 of the middle frame 300 is equal to the number of the penetration holes 240 of the front frame 200. The middle frame 300 is positioned with a certain interval from the front frame 200.

The outer stator 410 is formed accordingly as thin plates 411 of a certain shape are radially stacked to have a cylindrical shape. At this time, the thin plates 411 are radially stacked on the winding coil 430 of a ring shape. The outer stator 410 and the winding coil 430 positioned therein are molded with a plastic resin material for insulation and shape maintenance. The outer stator 410 is coupled to the inner stator 420, in which the outer stator 410 is positioned between the front frame 200 and the middle frame 300. At this time, the outer stator 410 is coupled to the inner stator 420 in a condition that the inner circumferential surface thereof can have a certain interval with the outer circumferential surface of the inner stator 420. Also, both side surfaces of the outer stator 410 are respectively in contact with one side surface 231 of the front frame plate portion 230 and one side surface 311 of the middle frame plate portion 310.

The coupling means 500 is composed of a plurality of coupling bolts 510 and nuts 520. The coupling bolts 510 are penetratingly inserted into the penetration holes 240 of the front frame 200 and the penetration holes 330 of the middle frame 300, respectively, and the nuts 520 are respectively coupled to the coupling bolts 510. As the front frame 200 and the middle frame 300 are coupled to each other by the coupling bolts 510 and the nuts 520, the outer stator 410 positioned between the front frame and the middle frame is fixed and coupled.

A mover 440 is inserted between the inner circumferential surface of the outer stator 410 and the outer circumferential surface of the inner stator 420. The mover 440 is composed of a holder 441 of a cylindrical shape and a plurality of magnets 442 fixedly coupled to the holder 441. The holder 441 is connected to a piston 800 inserted into the cylinder 700.

The sliding preventing means 600 includes a rough surface portion 232 and a rough surface portion 312. The rough surface portion 232 is formed at a contact surface 231 of the front frame plate portion 230 with which one side surface of the outer stator 410 is in contact, and the rough surface portion 312 is formed at a contact surface 311 of the middle frame plate portion 310 with which another side surface of the outer stator 410 is in contact. As a variation example of the sliding preventing means 600, the rough surface portions 232 and 312 can be formed only at one side of the front frame 200 and the middle frame 300.

The rough surface portions 232 and 312 are provided with a surface such as a sandpaper, and are formed by a knurling process as an example.

The rough surface portions 232 and 312 can be formed at parts contacting lateral surfaces of the outer stator 410, or can be partially formed at parts contacting the lateral surfaces of the outer stator 410.

Figure 7:
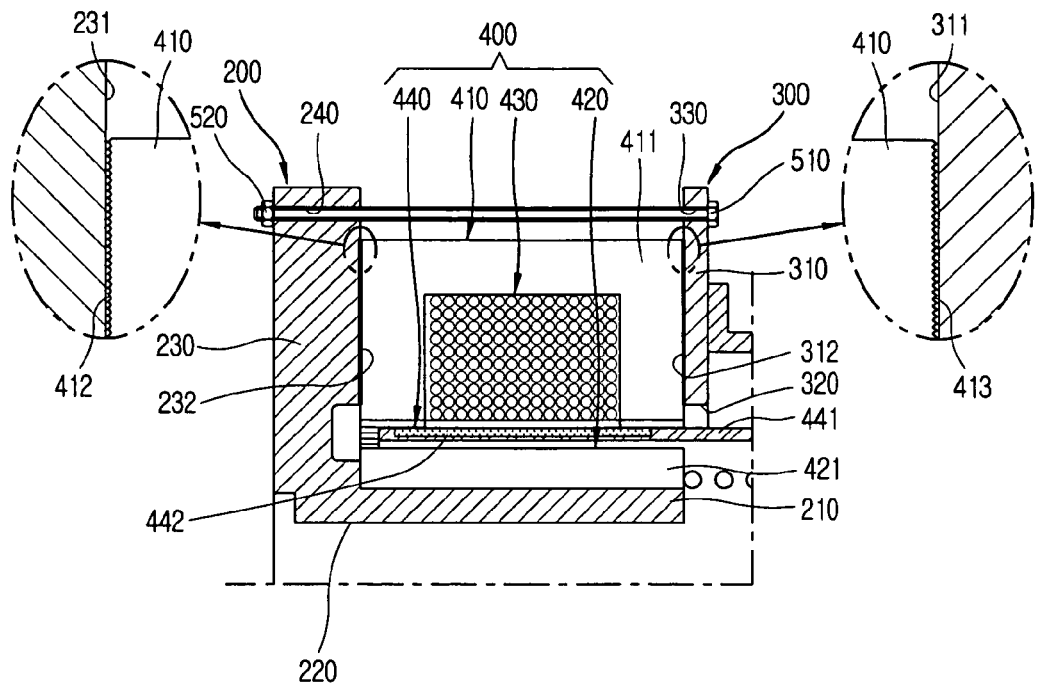
FIGS. 7 and 8 are sectional views showing anther embodiment of a motor fixing structure of a reciprocating compressor according to the present invention.

As shown in FIG. 7, as another embodiment, the sliding preventing means 600 includes a rough surface portion 412 and a rough surface portion 413.

The rough surface portion 412 is formed at one side contact surface of the outer stator 410 contacting the front frame 200 to increase a frictional force, and the rough surface portion 413 is formed at another side contact surface of the outer stator 410 contacting the middle frame 300 to increase a frictional force.

The rough surface portions 412 and 413 of the outer stator 410 are formed accordingly as rough surfaces are formed at both side surfaces of the thin plates 411 constituting the outer stator 410 and the thin plates 411 are stacked as a cylindrical shape. The rough surface portions 412 and 413 of the outer stator 410 are partially formed at the lateral surfaces of the outer stator 410 or entirely formed at the lateral surfaces thereof.

The rough surface portions 412 and 413 of the outer stator 410 can be formed at both side surfaces of the outer stator 410 by a knurling process.

Figure 8:
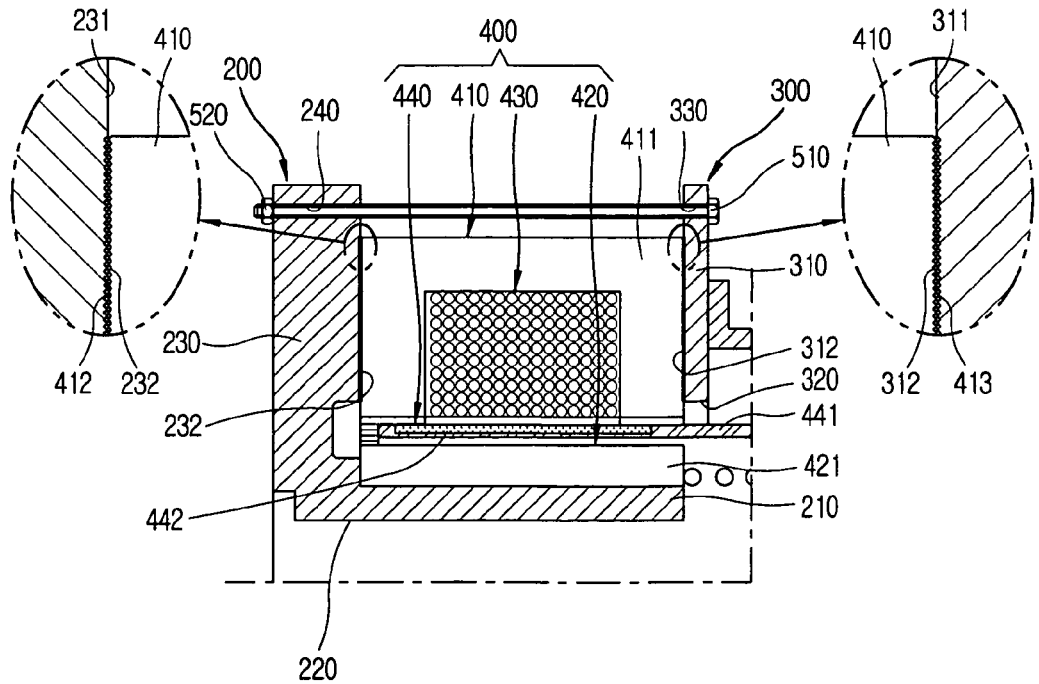

As shown in FIG. 8, as another embodiment, the sliding preventing means 600 includes rough surface portions 232, 412 and rough surface portions 312,413. The rough surface portions 232 and 412 for increasing a frictional force are respectively formed at a contact surface of the front frame 200 contacting with the outer stator 410 and at a contact surface of the outer stator 410 contacting the front frame 200, and the rough surface portions 312 and 411 for increasing a frictional force are respectively formed at a contact surface of the middle frame 300 contacting the outer stator 410 and at a contact surface of the outer stator 410 contacting the middle frame 300.

The rough surface portion 232 of the front frame 200 is formed at one surface 231 of the front frame plate portion 230, and the rough surface portion 312 of the middle frame 300 is formed at one surface 311 of the middle frame plate portion 310. The rough surface portions 232 and 312 are provided with a surface such as a sandpaper, and are formed by a knurling process.

The rough surface portions 232 and 312 of the front frame 200 and the middle frame 300 can be partially formed at parts contacting the lateral surfaces of the outer stator 410, or can be entirely formed at the parts contacting the lateral surfaces of the outer stator 410.

The rough surface portions 412 and 413 of the outer stator 410 are formed accordingly as rough surfaces are formed at both side surfaces of the thin plates 411 constituting the outer stator 410 and the thin plates 411 are stacked as a cylindrical shape.

Figure 9:
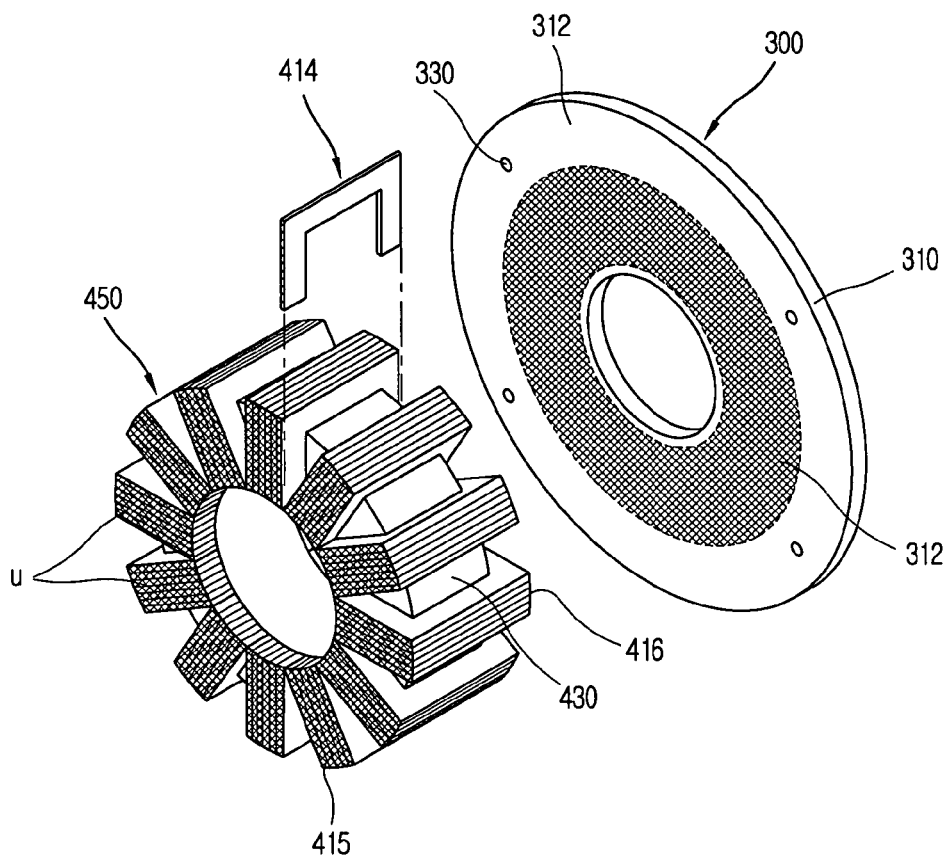
FIGS. 9 and 10 are disassembled perspective views showing another embodiment of a motor fixing structure of a reciprocating compressor according to the present invention.

The outer stator 410 constituting the driving motor 400 can be implemented as various shapes. As one example, as shown in FIG. 9, the outer stator 410 of the motor is formed accordingly as a unit stack body U composed of a plurality of stacked thin plates 414 of a certain shape is radially stacked on the winding coil 430 of a ring shape. That is, the outer stator has a form that a plurality of unit stack bodies U are radially stacked on the winding coil 430 of a ring shape. The winding coil 430 and the unit stack bodies U are molded by a plastic resin material for insulation.

In case of applying the outer stator 410, rough surface portions 415 and 416 are formed at both side contact surfaces thereof. That is, the rough surface portions 415 and 416 can be respectively or partially formed at the unit stack bodies U constituting the outer stator 410. The rough surface portions 415 and 416 of the outer stator are formed accordingly as rough surfaces are formed at both side surfaces of the thin plates 451 constituting the unit stack bodies U and the thin plates 451 are stacked. As another example, the rough surface portions can be formed at both side surfaces of the unit bodies U by a knurling process.

Figure 10:
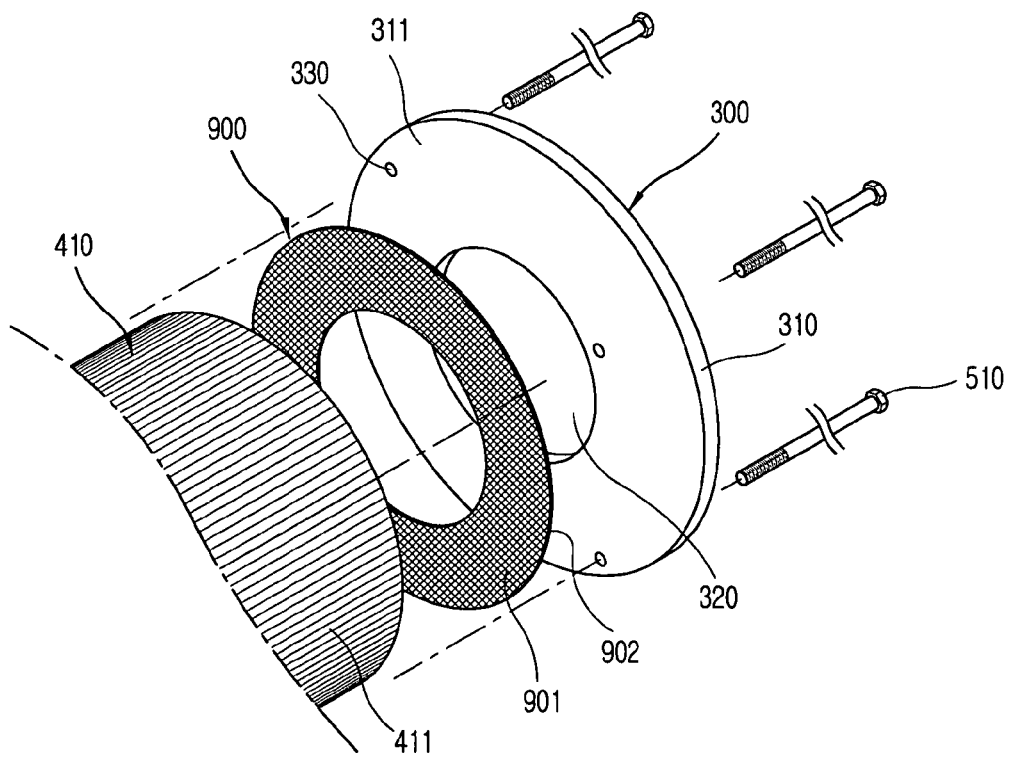

As still another example of the sliding preventing means 600, a sliding preventing plate 900 provided with rough surface portions 901 and 902 is respectively inserted between one side surface of the outer stator 410 and the front frame 200 which are in contact with each other and between another side surface of the outer stator 410 and the middle frame 300 which are in contact with each other. As shown in FIG. 10, the sliding preventing plate 900 is provided with the rough surface portions 901 and 902 formed at both side surfaces of a thin plate of a ring shape by a knurling process. In this case, additional components are inserted thereto thus to increase a fabrication cost a little, but an assembly variation is prevented.

Hereinafter, operational effects of the motor fixing structure of the reciprocating compressor will be explained. First, when an electric power source is applied to the driving motor 400, a flux is formed at the outer stator 410 and the inner stator 420 by an electric current applied to the winding coil 430 of the driving motor 400. By an interaction between said flux and a flux formed by the mover 440, the mover 440 linearly reciprocates and thus the piston 800 linearly reciprocates in the cylinder 700, thereby sucking, compressing, and discharging gas.

In the process that the piston 800 linearly reciprocates in the cylinder 700 and thus gas is sucked and compressed, vibration is generated and the vibration is transmitted to the assembled motor components. However, by the sliding preventing means 600, fixed states between the front frame 200 and the outer stator 410 and between the outer stator 410 and the middle frame 300 become firm. That is, even if vibration is transmitted to the motor components, the fixed states are not loosened but become firm by a frictional force of the sliding preventing means 600. Accordingly, an interval between the outer stator 410 and the inner stator 420 constituting the motor is constantly maintained.

Also, in case that a little variation is generated by a molding of the outer stator 410 and the winding coil 430 after a long time driving, an assembly variation is prevented by the sliding preventing means 600 thus to constantly maintain the interval between the outer stator 410 and the inner stator 420.

In the present invention, a motor is assembled by using a jig like in the conventional art thus not to require additional assembly processes, thereby simplifying an assembly process. Also, even though one processing process is added at the time of processing or fabricating components, an assembly dimension of a component can be precisely maintained.

As aforementioned, in the motor fixing structure of a reciprocating compressor according to the present invention, a motor assembly is simplified and an assembly dimension variation due to vibration generated at the time of driving after the motor assembly and due to a little variation of a molding is prevented, thereby maintaining a constant air gap. According to this, abrasion and damage of components due to a contact between the mover 440 linearly reciprocating between the outer stator 410 and the inner stator 420 and components between the outer stator 410 and the inner stator 420 are prevented thus to enhance a reliability of a product.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A motor fixing structure of a reciprocating compressor comprising:

a front frame having a predetermined shape;

a middle frame positioned with a certain interval from the front frame;

an outer stator positioned between the front frame and the middle frame so that an inner stator can be positioned with a certain interval therein;

a coupling means for fixing the outer stator positioned between the front frame and the middle frame by coupling the front frame and the middle frame to each other; and a sliding preventing means installed between the outer stator and the front frame contacting each other and/or between the outer stator and the middle frame contacting each other for preventing sliding, the sliding preventing means being a sliding preventing plate constituted with rough surface portions respectively formed at both sides of a thin plate of a ring shape.

* * * * *